March 8, 1932.    H. B. OURSLER    1,848,379
CROWN BLOCK PULLEY
Filed May 9, 1929    2 Sheets-Sheet 1
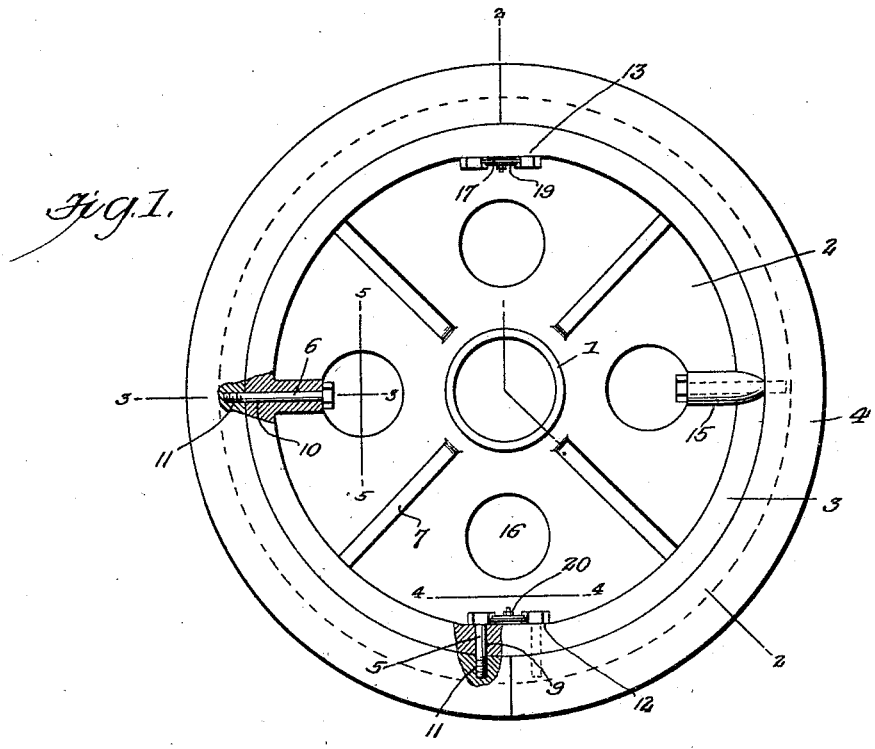
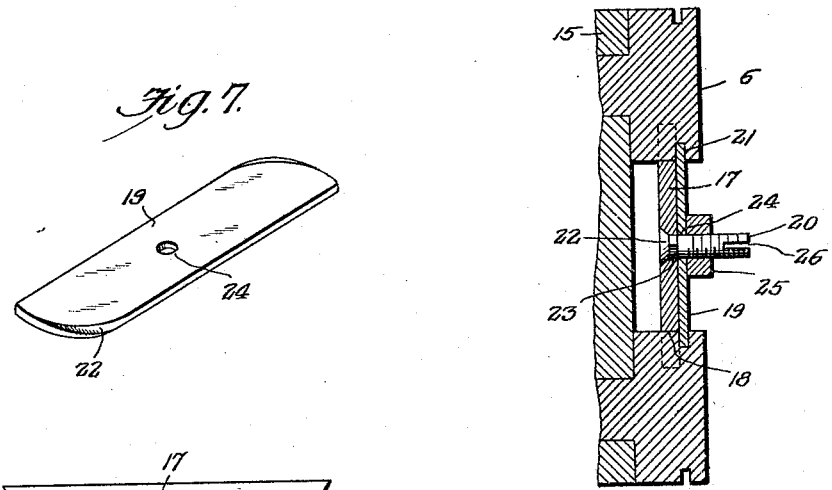
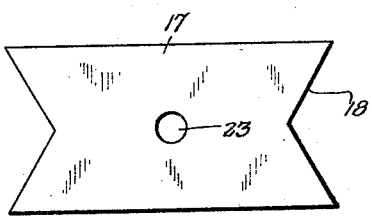
Inventor
H. B. Oursler,
By
Attorney March 8, 1932.                H. B. OURSLER                1,848,379
                            CROWN BLOCK PULLEY
                        Filed May 9, 1929        2 Sheets-Sheet 2
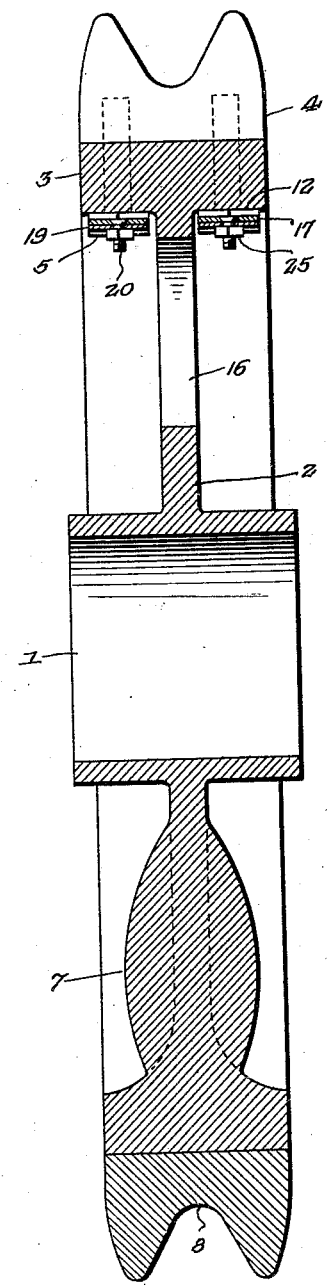
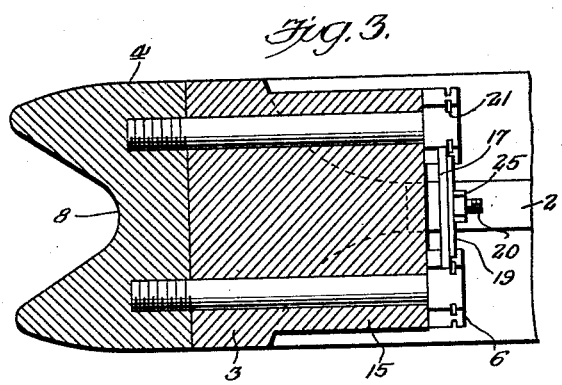
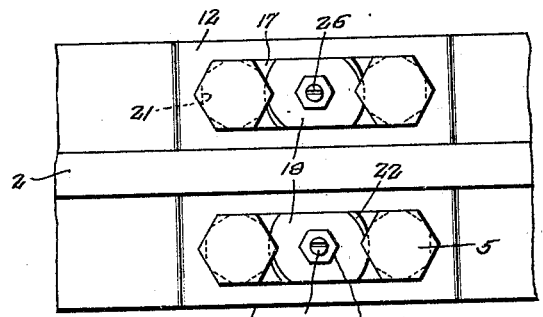
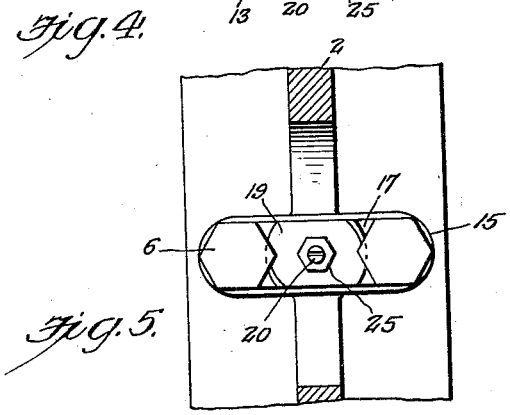
Inventor
H. B. Oursler,
By
Attorney Patented Mar. 8, 1932

1,848,379

UNITED STATES PATENT OFFICE

HOWARD B. OURSLER, OF PITTSBURGH, PENNSYLVANIA

CROWN BLOCK PULLEY

Application filed May 9, 1929. Serial No. 361,722.

The invention relates to improvements in crown block pulleys.

The object of the present invention is to improve the construction of pulleys and to provide a simple, practical, and efficient crown block pulley designed for use on oil well rigs and in various other places, and adapted when the rim becomes worn, of enabling the same to be readily renewed at a comparatively low cost relative to the cost of the pulley and without discarding the body portion of the pulley.

A further object of the invention is to equip the removable rim crown block pulley with means for locking the bolts with absolute security so that there will be no liability of accidents resulting from the loosening of rim bolts of pulleys having removable rims and operating at high speed and at high elevations where any looseness of the rim bolts is generally not discovered until too late to avoid an accident.

With these and other objects in view, reference will be had to the following description, together with the accompanying drawings forming part hereof, and while I have shown a specific embodiment, it will be understood that I may resort to minor changes in the various details, and similarly that the finish or arrangement of parts may be varied to suit requirements so long as they do not depart from the scope or spirit of the claims hereunto appended.

In the drawings:—

Figure 1 is a side elevation, partly in section of a removable rim crown block pulley, constructed in accordance with this invention.

Fig. 2 is a transverse sectional view, taken substantially on the line 2—2 of Fig. 1.

Fig. 3 is a transverse sectional view on the line 3—3 of Fig. 1.

Fig. 4 is a detail sectional view on the line 4—4 of Fig. 1.

Fig. 5 is a similar view on the line 5—5 of Fig. 1.

Fig. 6 is a detail longitudinal sectional view of one of the bolt locking devices.

Fig. 7 is a detail view of the contact plate of the bolt locking device.

Fig. 8 is a plan view of the bolt locking plate.

In the accompanying drawings in which is illustrated the preferred embodiment of the invention, the removable rim crown block pulley comprises in its construction a pulley body designed to be constructed of cast metal or other suitable material and consisting of a central hub portion 1, a disk web 2, and a thickened peripheral portion 3, all formed integral to one another, the thickened peripheral portion forming a seat for a pair of semi-circular removable rim sections 4 arranged on the said seat and secured to the same by end bolts 5 and intermediate bolts 6. The disk web portion 2 is preferably reinforced at diametrically opposite points with radially arranged ribs 7 arranged in pairs and located at the opposite faces of the web and providing spoke-like forms which reinforce the body of the pulley.

The rim sections which are grooved at 8 to receive a cable or other line, fit tightly against the peripheral portion of the body of the pulley and have their ends fitted tightly together and the said bolts 5 and 6 extend through openings 9 and 10 in the body portion of the pulley and engage threaded openings 11 in the rim sections of the pulley. The threaded openings 11 in the rim sections preferably terminate short of the outer periphery of the rim and are in the nature of threaded sockets to receive the outer threaded portions of the bolts 5 and 6. The heads of the bolts 5 engage flat faces or shoulders 12 of bosses or enlargements 13 located adjacent the end portions of the rim sections and formed integral with the body of the pulley at opposite sides of the peripheral portion thereof.

The heads of the bolts 6 engage flat faces or shoulders of bosses or enlargements 15 located adjacent the central portions of the rim sections and formed integral with the body of the pulley at opposite sides thereof. The web of the pulley is provided between the spoke formations with circular openings 16, two of which are located adjacent the heads of the bolts 6, as clearly illustrated in Fig. 1 of the drawings, and the other two openings are located diametrically opposite each other in line with the end portions of the rim sections. The openings are designed to facilitate access to the bolts and to locking means for engaging the heads of the bolts to prevent the bolts from being loosened by any jar or vibration to which the crown block pulley may be subjected.

The end bolts 5 are locked by fastening devices which are located at opposite sides of the body of the pulley and extend longitudinally of the rim sections, as clearly illustrated in Fig. 4 of the drawings, and the intermediate bolts are engaged by simple locking devices disposed transversely of the body portion of the pulley and extending through the adjacent openings 16. The heads of the bolts are preferably hexagonal and each pair is engaged by a lock plate 17 which is provided at its ends with tapering notches 18 conforming to the configuration of and adapted to receive the corner portions of the heads of the bolts, as clearly illustrated in Figs. 4 and 5 of the drawings.

The lock plate is of a length to fit snugly between a pair of bolts and extends longitudinally of the rim at the end portions thereof and transversely of the rim at the central portion of the same. The engagement of the corner portions of the hexagonal heads of the bolts will enable the bolts to be adjusted every sixth of a revolution of the bolt so that a comparatively fine adjustment is obtained. After the bolts have been tightened and their heads arranged with a corner of each pair of bolts opposite each other, the lock plate is placed in position.

The lock plate is secured in its engaging position by means of a contact plate 19 having rounded ends presenting substantially convex end edges to the bolt heads and adapted to be turned on a connecting bolt 20 to engage the ends of the contact plate in corner notches 21 of the bolt heads. The contact plate is of a thickness to fit snugly and tightly in the corner notches 21 and it is preferably filed slightly at diagonally opposite corners at 22 to enable it to enter readily the notches, and the distance between the extreme abutting portions of the rounded ends of the contact plate is such that when it is engaged in the notches of the bolt heads there will be no longitudinal play of the contact plate. The contact plate and the lock plate are drawn tightly together by means of the connecting bolt 20 having a head 22 countersunk in the lock plate and extending through register openings 23 and 24 in the contact and lock plates and equipped with a nut 25 arranged on the threaded portion of the connecting bolt and engaging the contact plate and holding the same in tight frictional engagement with both the lock plate and the bolt heads.

In order to maintain the plates in such engagement the nut 25 is located on the connecting bolt, preferably by splitting the threaded portion of the bolt at 26 and spreading the split threaded portion to prevent any retrograde rotation and loosening of the nut 25. Should it be desired to remove the connecting bolt, the spread split portion may be readily compressed by a suitable tool without injuring the screw thread.

The locking devices for the intermediate bolts 6 extend through the adjacent opening 16 and may be readily manipulated at the said opening 16. The locking devices for holding the end bolts 5 are located at opposite sides of the body of the pulley and by extending longitudinally of the rim do not require openings in the body for the convenient manipulation of such locking devices. When the bolts are locked they are securely held against rotation and the rim sections will be positively and securely held on the body of the pulley until the rim is worn to such an extent as necessitates renewal which may be had at a relatively low cost compared with the cost of the pulley. A worn rim may be readily removed by compressing the split end portion of the connecting bolt and then loosening the nut thereof. This will relieve the contact and lock plates of pressure and will enable the contact plate to be readily turned out of engagement with the notches of the bolt heads. When the contact plate is swung clear of the bolt heads the bolt locking devices may be readily removed which will permit the removal of the bolts and the ready renewal of the rim of the pulley.

The lugs or enlargements 15 are of greater length than the lugs or enlargements 13 in order to arrange the locking devices of the intermediate bolts at the adjacent opening 16, and the intermediate bolts are correspondingly increased in length to enable them to extend through the lugs or enlargements 15 to the rim sections.

What is claimed is:

1. A removable rim pulley comprising a pulley body provided at its periphery with a seat, rim sections arranged on the said seat, bolts arranged in pairs at the ends of the rim sections and at intermediate points, the end bolts being spaced apart longitudinally of the rim and the intermediate bolts being spaced apart transversely of the rim, locking devices engaging the bolts of each pair and disposed longitudinally of the rim at the end of the rim sections and arranged transversely of the rim at the intermediate bolts.

2. A removable rim pulley comprising a pulley body provided at its periphery with a seat, rim sections arranged on the said seat, bolts arranged in pairs at the ends of the rim sections and at intermediate points, the end bolts being spaced apart longitudinally of the rim and the intermediate bolts being spaced apart transversely of the rim, locking devices engaging the bolts of each pair and disposed longtudinally of the rim at the end of the rim sections and arranged transversely of the rim at the intermediate bolts, said body portion being provided at the said bolts with lugs presenting flat faces, the lugs of the intermediate bolts being extended and the body portion of the pulley being provided with openings through which the transverse locking devices pass.

3. A removable rim pulley comprising a pulley body provided at its periphery with a seat, rim sections arranged on the said seat, bolts arranged in pairs at the ends of the rim sections and at intermediate points, the end bolts being spaced apart longitudinally of the rim and the intermediate bolts being spaced apart transversely of the rim, locking devices engaging the bolts of each pair and disposed longitudinally of the rim at the end of the rim sections and arranged transversely of the rim at the intermediate bolts, said body portion being provided at the transverse locking devices with openings through which the same pass.

4. A removable rim pulley comprising a body portion consisting of a hub integral web and integral peripheral portion enlarged to form a seat, rim sections arranged on the said seat, intermediate and end bolts mounted on the peripheral portion of the body and engaging the rim sections and arranged in pairs, the members of each pair of end bolts being spaced apart longitudinally of the rim and the intermediate bolts being spaced apart transversely of the rim, locking devices for the said bolts, the locking devices for the end bolts being disposed longitudinally of the rim and the body portion of the pulley being provided with openings through which pass the locking devices for the intermediate bolts.

5. A removable rim pulley comprising a pulley body and removable rim sections, spaced bolts mounted on the pulley body and engaging the rim sections and arranged in pairs and provided with polygonal heads and locking devices for the said bolts including a lock plate bridging the space between the bolts of each pair and having terminal recesses arranged to receive the corners of the bolt heads to hold the bolts against rotation, a contact plate pivotally connected with and carried by the lock plate and detachably interlocked with the bolt heads to hold the lock plate against outward movement and adapted to be swung into and out of such engagement, and means for securing the contact plate in engagement with bolts.

6. A removable rim pulley comprising a pulley body and removable rim sections, bolts mounted on the pulley body and engaging the rim sections, and arranged in pairs and provided with polygonal heads and locking devices for the said bolts including a lock plate bridging the space between the bolts of each pair and provided with terminal recesses arranged to receive the corners of the bolt heads, the latter being also provided in its corners with notches, and a pivoted contact plate mounted on and carried by the lock plate and arranged to swing into and out of engagement with the corner notches of the bolt heads to detachably interlock the contact plate with the bolts for holding the lock plate against outward movement.

7. A removable rim pulley comprising a pulley body and removable rim sections, bolts mounted on the pulley body and engaging the rim sections and arranged in pairs and provided with polygonal heads and locking devices for the said bolts including a lock plate extending between the bolts of each pair and provided with terminal recesses to receive the corners of the bolt heads, the latter being provided at their corners with notches, a contact plate extending longitudinally of the lock plate and engaged with opposite notches of the bolt heads and detachably interlocked therewith and holding the lock plates against outward movement, and a connecting bolt piercing the lock plate and the contact plate and detachably connecting said plates and having a nut for clamping the contact plate in tight engagement with the lock plate and the bolt heads, said contact plate being adapted to be swung into and out of engagement with the bolt heads when not clamped by the nut.

8. A removable rim pulley comprising a body portion consisting of a hub, a web and a peripheral portion tapered cross sectionally, the said body portion being provided at opposite sides with lugs forming shoulders and the web being provided with an opening at the said shoulders, a rim section arranged on the peripheral portion of the body, bolts piercing the lugs and the peripheral portion of the body and engaging the rim section at opposite sides of the web and having heads located at the said opening, a lock plate extending through the opening and engaging the heads of the bolts of each pair to hold the same against rotation, a contact plate pivotally connected with the lock plate and interlocked with the bolt heads and holding the lock plate against outward movement and adapted to swing into and out of such interlocked relation, and means for securing the contact plate interlocked with the bolt heads.

9. A pulley comprising a body, including a hub and peripheral seat, and a sectional rim removably mounted on said seat, means at opposite sides of the body bridging the joints between and connecting the ends of the rim sections, and other means extending transversely of the body and connected to the respective rim sections intermediate their ends and at opposite sides of the body.

10. A pulley comprising a body, including a hub and peripheral seat, an intermediate web and a sectional rim removably mounted on the said seat, of means at opposite sides of the web connecting the adjacent ends of the rim sections to the seat, and other means connecting the respective rim sections intermediate their ends to the seat and web at opposite sides of the latter.

11. A pulley comprising a body, including a hub and peripheral seat, an intermediate web and a sectional rim removably mounted on the said seat, of means at opposite sides of the web bridging the joints between and connecting adjacent ends of the rim sections, and other means extending across the web and connecting the respective rim sections intermediate their ends.

In testimony whereof I have hereunto set my hand this 3rd day of May, 1929.

HOWARD B. OURSLER.